June 29, 1965 T. G. CUNNING ETAL 3,192,052
METHOD FOR SPRAY COATING FRUIT AND VEGETABLES
Filed July 6, 1962 2 Sheets-Sheet 1
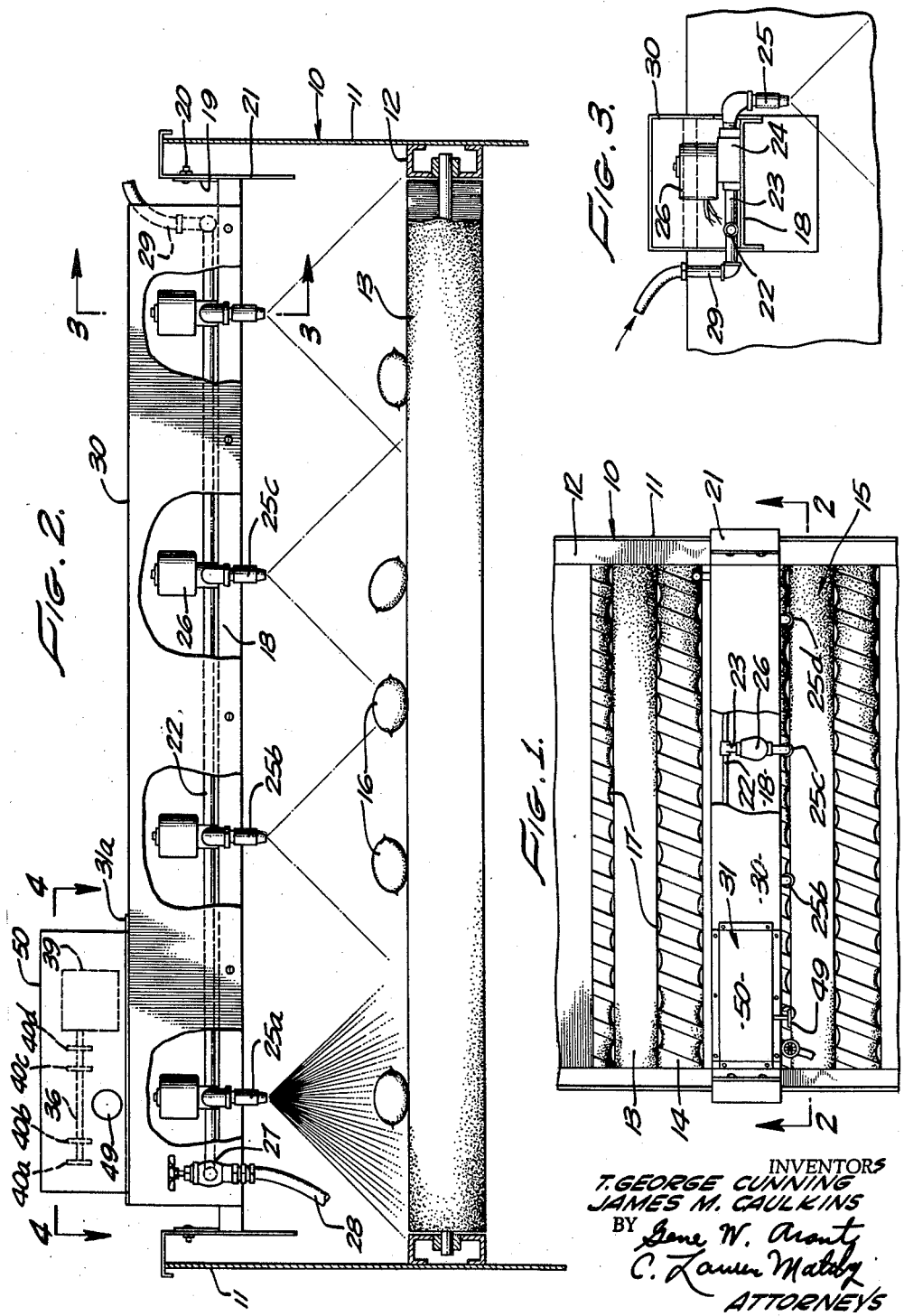
INVENTORS
T. GEORGE CUNNING
JAMES M. CAULKINS
BY
ATTORNEYS

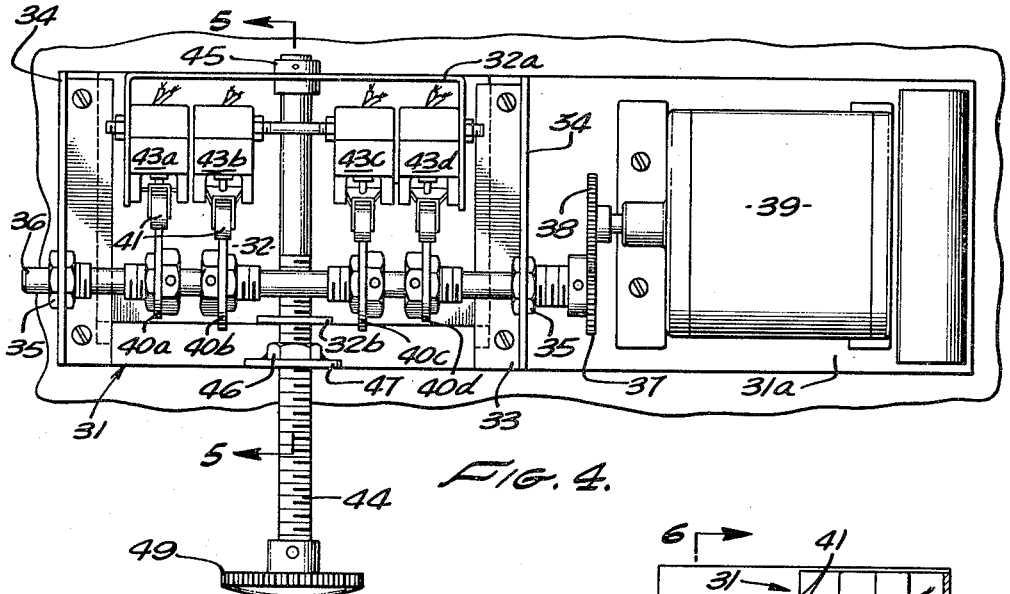
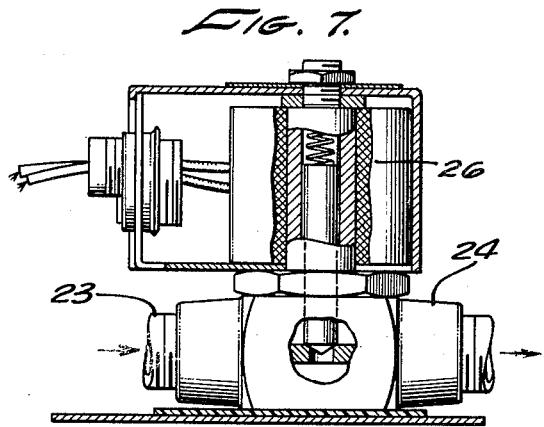
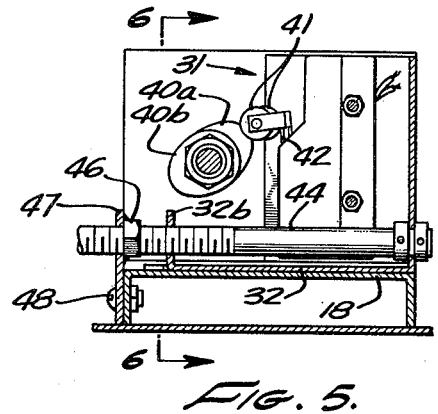
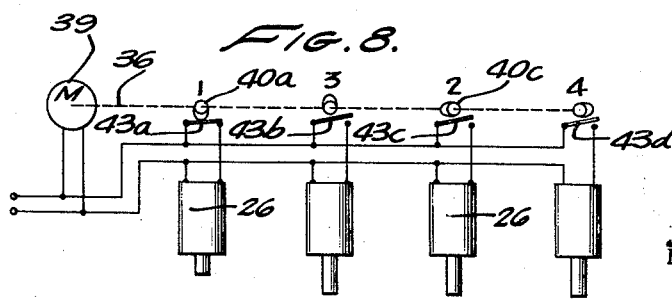
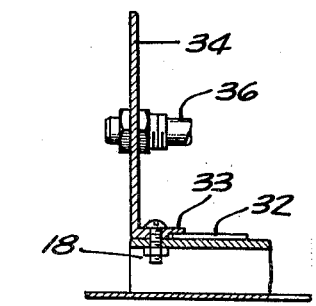

United States Patent Office
3,192,052
Patented June 29, 1965

3,192,052
METHOD FOR SPRAY COATING FRUIT
AND VEGETABLES
Thomas George Cunning, Ontario, and James M.
Caulkins, Santa Paula, Calif., assignors to T.
George Cunning, Ontario, Calif., and Gladys H.
Cunning, Ontario, Calif., jointly
Filed July 6, 1962, Ser. No. 208,144
2 Claims. (Cl. 99—168)

This invention relates to the coating of agricultural products and more especially to a method and apparatus for the application of a coating of wax or similar material by a spraying process.

According to conventional processes for spray-coating of fruits and vegetables the particles are put on a moving conveyor and are continuously jostled or turned, at least at the point where they pass under the spraying mechanism. In this process the spraying mechanism may include one or more spray nozzles directed downwardly from above the conveyor, and these nozzles are generally used for continuously spraying the coating material, such as molten wax, on the fruit or vegetables. In such processes it is required to control the amount of wax being sprayed, and for this purpose the fluid pressure supplied to the spray nozzles is frequently varied from time to time.

Such processes are subject to certain shortcomings and deficiencies. One is that when the fluid pressure drops there is a tendency for the nozzles to clog. Another objection is that the fluid spray pattern from the spray nozzles varies as a function of the fluid pressure and, as a consequence, the distribution of the wax on the articles being treated varies considerably and lacks uniformity, the variation being a function of the fluid pressure in the system.

These and other objections and shortcomings of conventional methods are overcome in the present invention wherein the control is not by varying the fluid pressure, but rather to turn the several spray nozzles on and off intermittently while maintaining constant pressure in the fluid system. As a consequence the spray pattern is constant at all times during the spraying operations. A further advantage is that a sufficiently high pressure level can be maintained so that there is never a problem of clogging the nozzles. In order to control the total amount of wax that is applied as a coating, the procedure is to vary the time durations when the nozzles are turned on.

The method of spray coating wax on agricultural products according to the present invention is carried out by electrical actuation and control of a plurality of spray jet nozzles as the articles to be coated are moved along a conveyor path while being jostled or agitated to turn the articles about and at a relatively high rate of speed. A novel timing control for the actuation of the nozzles provides a cycle of operation wherein each nozzle is turned on for a limited period of time, such as for a fraction of a second, and about once every one or two seconds, and the apparatus of this invention provides for varying this time cycle and the intervals as may be long or short as desired or needed to meet the particular conditions of coating.

It is, therefore, the primary objective of this invention to provide a novel apparatus and method for applying a liquid containing a concentrated substance to the surfaces of fruit and vegetables as they move along a given path of travel.

Another object of the invention is to provide improved means for spray-coating a wax composition substance to the surfaces of agricultural products incorporating improved means for controlling and varying the intensity of the coating.

A further object of the invention is to provide novel apparatus for applying interrupted jet sprays of coating materials to fruits and vegetables as they move along a conveyor path.

Other objects and advantages of this invention will appear and be brought out more fully in the following specification, reference being had to the accompanying drawing, in which:

FIG. 1 is a top plan view of a wax spray coating apparatus incorporating the present invention;

FIG. 2 is a sectional view, enlarged, taken along line 2—2 of FIG. 1;

FIG. 3 is a partial view, in section, taken along line 3—3 of FIG. 2;

FIG. 4 is a sectional view, enlarged, taken along line 4—4 of FIG. 2;

FIG. 5 is a sectional view taken along line 5—5 of FIG. 4;

FIG. 6 is a sectional view taken along line 6—6 of FIG. 5;

FIG. 7 is an enlarged partial view, in section, taken substantially along line 3—3 of FIG. 2; and FIG. 8 is a schematic view showing the circuit wiring for the electrical apparatus of this invention.

Referring now more particularly to the drawing, and especially to FIGS. 1 to 3, the apparatus of this invention is incorporated in a structure having a frame 10 which has side plate members 11 to provide a conveyor. A channel member 12 extends along one side of each plate member 11 and provides suitable bearings for a plurality of roller brushes 13 and 14 which form the conveyor indicated generally at 15. Rollers 13 and 14 are of two types, rollers 14 having spiral grooves or sculptured formations 17 and these rollers are spaced alternately between rollers 13, the construction being such that the articles of fruit or vegetables, indicated at 16, are jostled, and rolled or turned and may be shifted laterally of the conveyor as the articles are progressed along the conveyor and under the jet spray system to be presently described.

The spray rack of this invention comprises an inverted channel member 18 having up-turned ends 19 which are secured to and supported by bolts 20 extending through vertical slots in a pair of L-shaped hanger members 21 which rest on and are slidable along the top edges of side-plate members 11. A header pipe 22 is supported on and extends along channel 18 and has a plurality of branches 23 to each of which is connected a valve 24, the several valves having connected thereto a plurality of spray jets indicated at 25a, 25b, 25c, and 25d, respectively, which jets are directed downwardly toward the conveyor 15, as may be clearly seen in FIGS. 2 and 3. Valves 24 are electrically operated, each having a solenoid actuator 26. A shut-off control valve 27 is provided at one end of the header pipe 22 for connection to a supply pipe 28. A suitable cover 30 is provided for the valves and solenoids.

Referring now to FIGS. 4 and 5 there is there shown a spray valve actuating switch unit, indicated generally at 31, which is mounted on a plate 31a secured on cover 30 at one end thereof. A micro-switch base plate 32 is slidable on plate 31a and guided by a pair of flanges 33 secured on base plate 31a in a manner to permit plate 32 to move forwardly and rearwardly. Flanges 33 are each formed as the lower portion of a pair of vertical mounting plates 34 which have suitable bearing formation 35 for a rotatable cam shaft 36. A gear 37 is secured on one end of shaft 36 and meshes with a gear 38 on the drive shaft of a motor 39 which is secured on base plate 31a.

A plurality of elliptical cams 40a, 40b, 40c, and 40d are secured on shaft 36, and each cam engages a roller 41 carried at the end of a switch lever arm 42 of one of a plurality of mirco-switches 43a, 43b, 43c, and 43d which are suitably secured on upstanding flange formations 32a of plate 32. An adjusting screw 44 has a bearing mounting 45 on flange 32a and is run through a nut 46 welded on an upstanding tab 47 secured as by a bolt 48 to channel member 18. Adjusting screw 44 is run through a guide opening in a tab portion 32b of plate 32, by which arrangement the plate and the micro-switches are moved forwardly and rearwardly when the adjusting screw 44 is turned. Screw 44 has a turning knob 49. A suitable cover 50 is provided for the valve actuating and switch unit.

The high portion of cams 43a to 43d are at different radial positions with respect to each other as may be seen in FIGS. 4, 5, and 8 and are shown as having a 90° angular offset arrangement whereby only one micro-switch 43 will be actuated at a time to close the circuit to its associated solenoid 26 for opening a valve 24 of the jet spray system. By appropriate adjustment of adjusting screw 44 the micro-switches 43a to 43d will be shifted forwardly or rearwardly so that the time duration of the open position of the respective valves 24 may be varied and, in a typical operation, each opening period may be for a small fraction of a second and the speed of rotation of shaft 36 may be set so as to turn each valve on about once every one or two seconds.

In the operation of the invention the molten wax is supplied under a fixed pressure from supply pipe 28 into the header pipe 22 and, upon operation of motor 39, the several micro-switches, 43a, 43b, 43c and 43d, will be actuated by the cams 40a, 40b, 40c and 40d, respectively, to selectively open the valves 24 whereby spray jets of the wax will be directed substantially in the manner of FIG. 2 toward the fruit or vegetables 16 as they are moved under the spray system by the conveyor 15, during which time they will be turned and rotated so that all surfaces thereof will receive a coating of the wax. By test sampling, the proper time period of the jet sprays can be established to effect the proper wax coating and adjustment of the time period as desired or needed may be accomplished by rotation of adjusting screw 44. Also the angle of overlap of the spray jets may be varied by raising or lowering the channel member 18 in its mounting to the hangers 21. In view of the fact that the jets are operated separately the jet pressure, as determined by the header pipe 22, can be maintained at a constant amount thus assuring a uniformity in the jet sprays as they are directed towards the articles to be covered or coated. After completion of the spraying operation the system can be cleaned out by the application of fresh water to return pipe connection 29 for a back flush action.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. The method of spray coating agricultural products comprising the steps of:

moving said agricultural products along a horizontal path of travel; and directing a plurality of intermittent and non-synchronous sprays of coating material from a position above the moving agricultural products onto said agricultural products, thereby forming a spray pattern of coating material which changes substantially continuously as a function of time.

2. The method of spray coating articles comprising the steps of:

moving said articles along a horizontal path of travel; and directing a plurality of intermittent and non-synchronous sprays of coating material from a position above the moving articles onto said articles, thereby forming a spray pattern of coating material which changes substantially continuously as a function of time.

References Cited by the Examiner

UNITED STATES PATENTS

| | | | |
|---|---|---|---|
| Re. 13,999 | 10/15 | Westerman | 118—25 |
| 1,036,107 | 8/12 | Harton | 118—25 |
| 1,820,252 | 8/31 | Shippy | 137—624.2 |
| 1,921,740 | 8/33 | Foote | 137—624.2 |
| 2,212,621 | 8/40 | Sharma | 99—168 |
| 2,342,063 | 2/44 | Sells et al. | 99—168 |
| 2,374,288 | 4/45 | Hinkley et al. | 117—105.4 |
| 2,434,125 | 1/48 | Schweitzer | 117—105.4 |
| 2,467,989 | 4/49 | Porch | 99—168 X |
| 2,898,881 | 8/59 | Straley | 99—168 X |

A. LOUIS MONACELL, *Primary Examiner.*

RICHARD D. NEVIUS, HYMAN LORD, *Examiners.*